(12) United States Patent
Kumarasamy et al.

(10) Patent No.: US 8,351,355 B2
(45) Date of Patent: Jan. 8, 2013

(54) H.323 TO SIP INTERWORKING FOR CALL FORWARD/REDIRECTION

(75) Inventors: Parameswaran Kumarasamy, San Jose, CA (US); Jayesh Chokshi, Cupertino, CA (US); Anantha Seetharaman, Santa Clara, CA (US); Kavithadevi Parameswaran, San Jose, CA (US); Shyam Patnam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1661 days.

(21) Appl. No.: 11/509,967

(22) Filed: Aug. 24, 2006

(65) Prior Publication Data

US 2008/0062964 A1 Mar. 13, 2008

(51) Int. Cl.
*H04L 12/16* (2006.01)
*H04Q 11/00* (2006.01)

(52) U.S. Cl. .......................... 370/271; 370/352; 370/467

(58) Field of Classification Search .................. 370/271, 370/466, 467
See application file for complete search history.

(56) References Cited

U.S. PATENT DOCUMENTS

2001/0046234 A1* 11/2001 Agrawal et al. ............... 370/402
2003/0147380 A1* 8/2003 Hakuli .......................... 370/352

OTHER PUBLICATIONS

H. Schulzrinne, "Session Initiation Protocol (SIP)—H.323 Interworking Requirements", Network Working Group, 16 pages, Jul. 2005.
Hemant Agrawal, "SIP—H.323 Interworking", Aquired at: http://ietfreport.isoc.org/cgi-bin/id2pdf?f1=draft%2dagrawal%2dsip%2dh323%2dinterworking%2d01%2etxt , Internet Engineering Task Force, 104 pages, Jul. 13, 2001.

* cited by examiner

*Primary Examiner* — Asad Nawaz
*Assistant Examiner* — Justin N Mullen
(74) *Attorney, Agent, or Firm* — Fish & Richardson P.C.

(57) ABSTRACT

In a particular embodiment, interworking between an H.323 protocol and SIP protocol for a call forward/redirection is provided. A first user may call a second user. The second user may have set preferences that cause a call redirection/forward to another end device. The end device may be associated with the second user or another user. Different preferences for the call forward/redirection may be provided. For example, a call may be forwarded all the time, when the second end device is busy, when there is no answer, etc. The redirection may then be performed using a gateway. When end devices communicate using SIP and H.323, the gateway provides interworking to provide the call forward/redirection. For example, the gateway maps a 3xx message in SIP to an H.450.3 message in the H.323 protocol, and vice versa, to provide the call forward/redirection.

18 Claims, 8 Drawing Sheets

Received:
SIP/2.0 302 Moved Temporarily
Via: SIP/2.0/UDP 15.5.15.60:5060;branch=z9hG4bKB5F05
502 ⌒ From: <sip:1001@15.5.15.60>;tag=A3F9034-124E
504 ⌒ To: <sip:4001@15.5.15.64>;tag=AF3424E8-2E8
Date: Sun, 16 Feb 2003 04:12:48 GMT
506 ⌒ Call-ID: F026A06E-97E811DA-810A81FE-E43E823C@15.5.15.60
Timestamp: 1139410167
Server: Cisco-SIPGateway/IOS-12.x
CSeq: 101 INVITE
Allow-Events: telephone-event
Diversion: <sip:4001@15.5.15.64:5060>;reason=unconditional
508 ⌒ Contact: <sip:2001@15.5.15.60>

*Fig. 5A*

073695: *Feb 8 14:49:27.844: H450 OUTGOING PDU ::= value CallRerouting_ARGUMENT ::=
{
  reroutingReason 1
  originalReroutingReason 1
  calledAddress
  {
    destinationAddress
    {
      dialedDigits : "2001" ⌒510
    }
  }
  diversionCounter 65535
  h225InfoElement {}
  lastReroutingNr
  {
    destinationAddress
    {
      dialedDigits : ""
    }
  }
  subscriptionOption 0
  callingNumber
  {
    destinationAddress
    {
      dialedDigits : "1001" ⌒512
    }
  }
  originalCalledNr
  {
    destinationAddress
    {
      dialedDigits : "4001" ⌒514
    }
  }
}

H.323 TO SIP INTERWORKING FOR CALL FORWARD/REDIRECTION

BACKGROUND

Particular embodiments of the present invention generally relate to telecommunications and more specifically to providing an H.323 to SIP interworking for a call forward.

Voice over internet protocol (VOIP) has become popular and prevalent for communications. VOIP systems may use different protocols, such as H.323 and session initiation protocol (SIP), to set up calls. Previously, end points communicating using different protocols, such as one end point communicating an H.323 and another end point communicating using SIP, could not communicate. However, basic connections for interworking the H.323 and SIP protocols has been addressed where a call between two parties can be set up when the H.323 and SIP protocols are being used. However, the interworking defined includes only basic connections and does not provide interworking for supplementary features that are either provided by H.323 or SIP.

DESCRIPTION OF EXAMPLE EMBODIMENTS

Particular embodiments provide interworking between an H.323 protocol and SIP for a call forward/redirection. In a particular embodiment, a first user may call a second user. The second user may have set preferences that cause a call redirection/forward to another end device. The end device may be associated with the second user or another user. Different preferences for the call forward/redirection may be provided. For example, a call may be forwarded all the time, when the second end device is busy, when there is no answer, etc. The redirection may then be performed using a gateway. When end devices communicate using SIP and H.323, the gateway provides interworking to provide the call forward/redirection. For example, the gateway maps a 3xx message in SIP to an H.450.3 message in the H.323 protocol, and vice versa, to provide the call forward/redirection.

Figure 1:
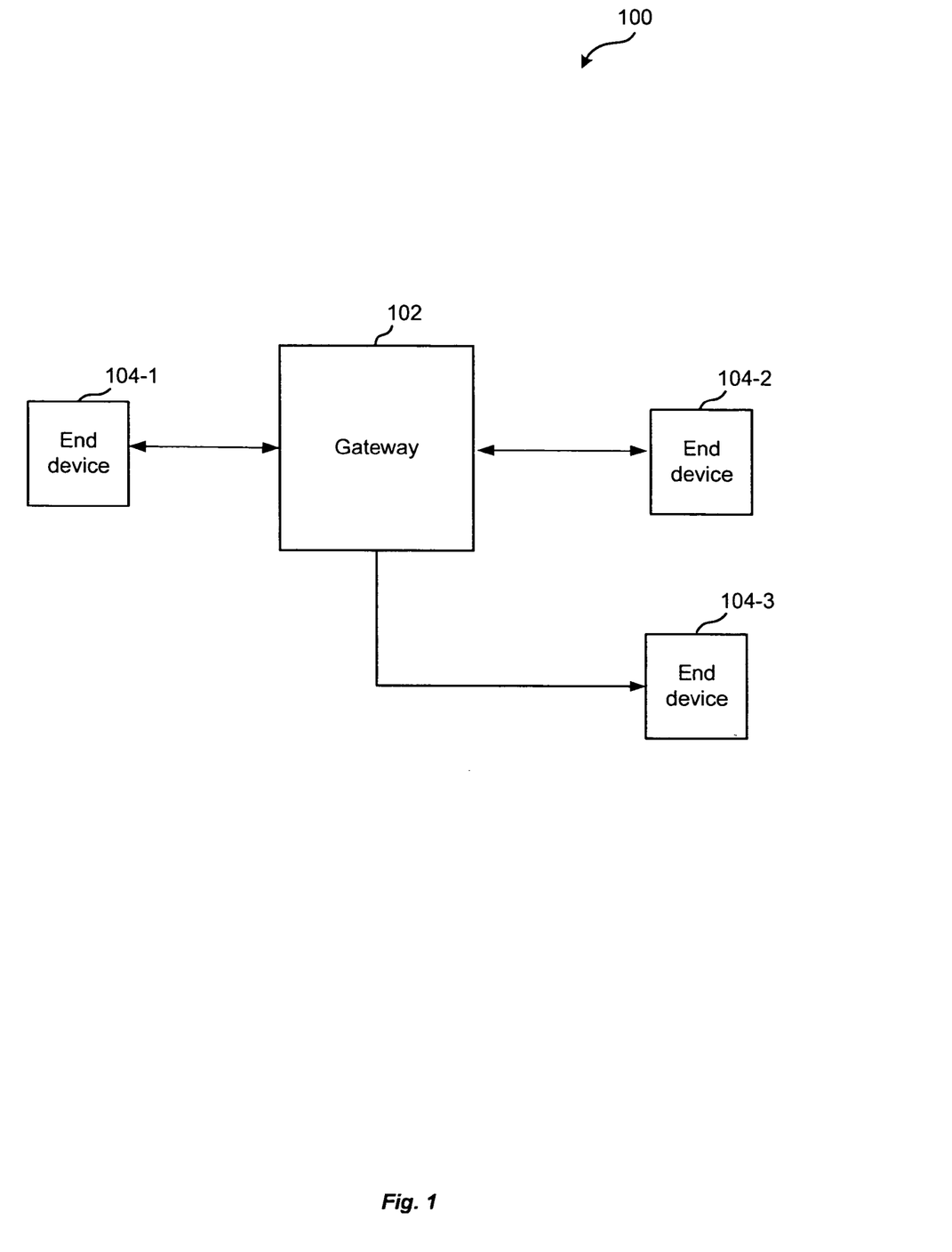
FIG. 1 illustrates an example system for providing interworking between the H.323 protocol and SIP.

FIG. 1 illustrates an example system 100 for providing interworking between the H.323 protocol and SIP. As shown, a gateway 102 and end devices 104 are provided.

End devices 104 may be any devices that can participate in a communication. For example, end devices 104 may be VOIP telephones, computers, instant messaging clients, cell phones, soft phones, or any other devices that can participate in a communication.

End devices 104 may communicate using either the H.323 protocol or SIP. Although H.323 and SIP are described, it will be recognized that other protocols may be appreciated. For example, successor protocols or enhancements to H.323 and/or SIP may be used by particular embodiments of the present invention.

In a particular embodiment, end device 104-1, end device 104-2, and end device 104-3 may be in different networks. They may be interconnected via gateway 102.

Gateway 102 may be any network device configured to manage communications with end devices 104. In a particular embodiment, gateway 102 includes session border controllers, SIP proxies, IP-PBXs, media gateways, soft switches, back-to-back user agents (B2BUAs), IP-to-IP gateways, etc. Gateway 102 sits in-between end devices 104 and may interconnect various networks that use different protocols and services.

In a particular embodiment, gateway 102 is configured to provide interworking between different protocols. In one example, end device 104-1 may communicate using a first protocol and end device 104-2 and/or end device 104-3 may communicate using a second protocol. Gateway 102 provides interworking between different protocols such that end device 104-1 may communicate with end device 104-2 and/or end device 104-3.

Gateway 102 may interwork a SIP 3xx message to an H.450.3 message in the H.323 protocol. Also, gateway 102 may interwork an H.450.3 message to a SIP 3xx message. This causes a call forward/redirection from, for example, end device 104-2 to end device 104-3.

In a particular embodiment, signaling to redirect/forward a call may occur between end devices 104 using SIP and end devices 104 using H.323, and vice versa. Signaling for providing the forward will be described in more detail below.

Figure 2:
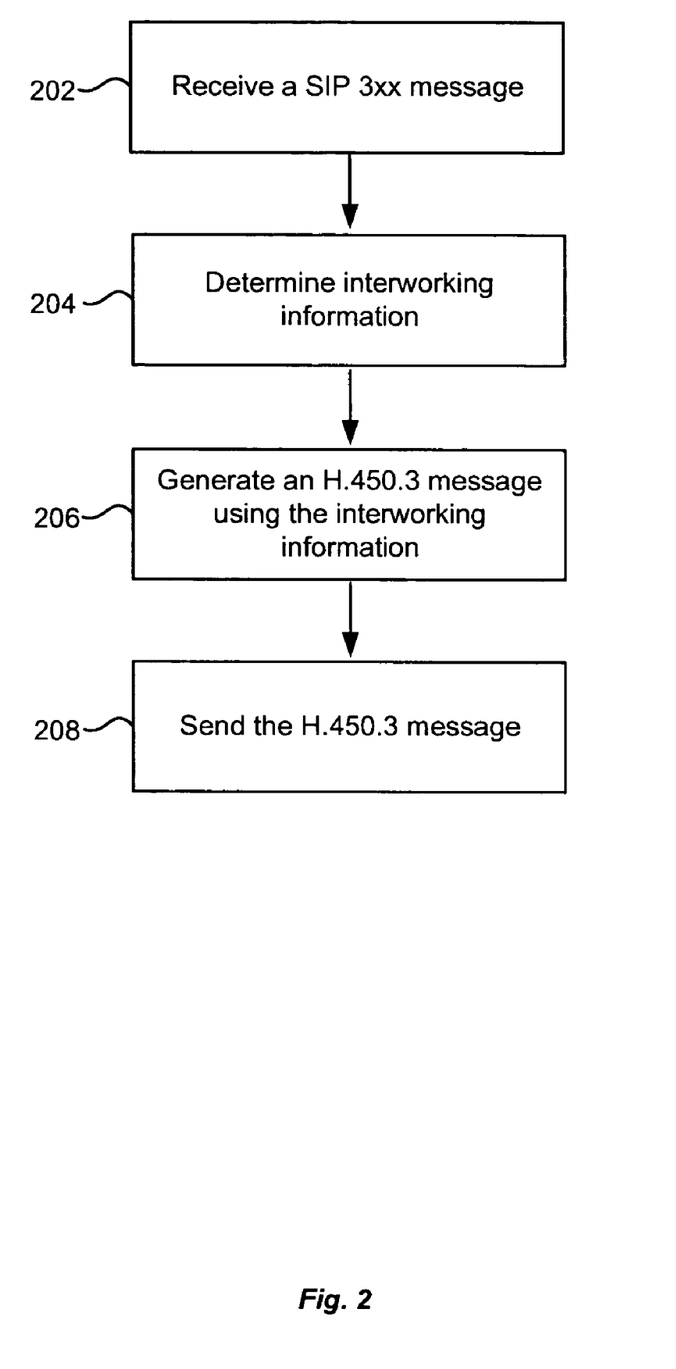
FIG. 2 illustrates an example method for interworking between an H.323 protocol and a SIP protocol for a call forward/redirection.

FIG. 2 illustrates an example method for interworking between an H.323 protocol and a SIP protocol for a call forward/redirection. This figure discusses a method of interworking from a SIP 3xx message to an H.450.3 message.

In step 202, gateway 102 receives a SIP 3xx message from end device 104-2. The SIP 3xx message indicates that a forward/redirection to end device 104-3 is desired.

In step 204, gateway 102 determines interworking information for the call forward/redirection. Because end device 104-1 and end device 104-2 communicate using different protocols, the SIP 3xx message cannot be forwarded to end device 104-1 to initiate the forward. Accordingly, interworking information is determined. In a particular embodiment, gateway 102 parses the SIP 3xx message to determine fields that include information that should be included in (or used to determine information to include in) an H.450.3 message.

In step 206, gateway 102 generates an H.450.3 message using the interworking information. The H.450.3 message is a message that can initiate a forward/redirection to end device 104-3 in the H.323 protocol.

In step 208, gateway 102 sends the H.450.3 message to end device 104-1. This initiates a forward/redirection of the call to end device 104-3. As is known in the art, the forward may then be completed using additional H.323 messages and SIP messages.

Figure 3:
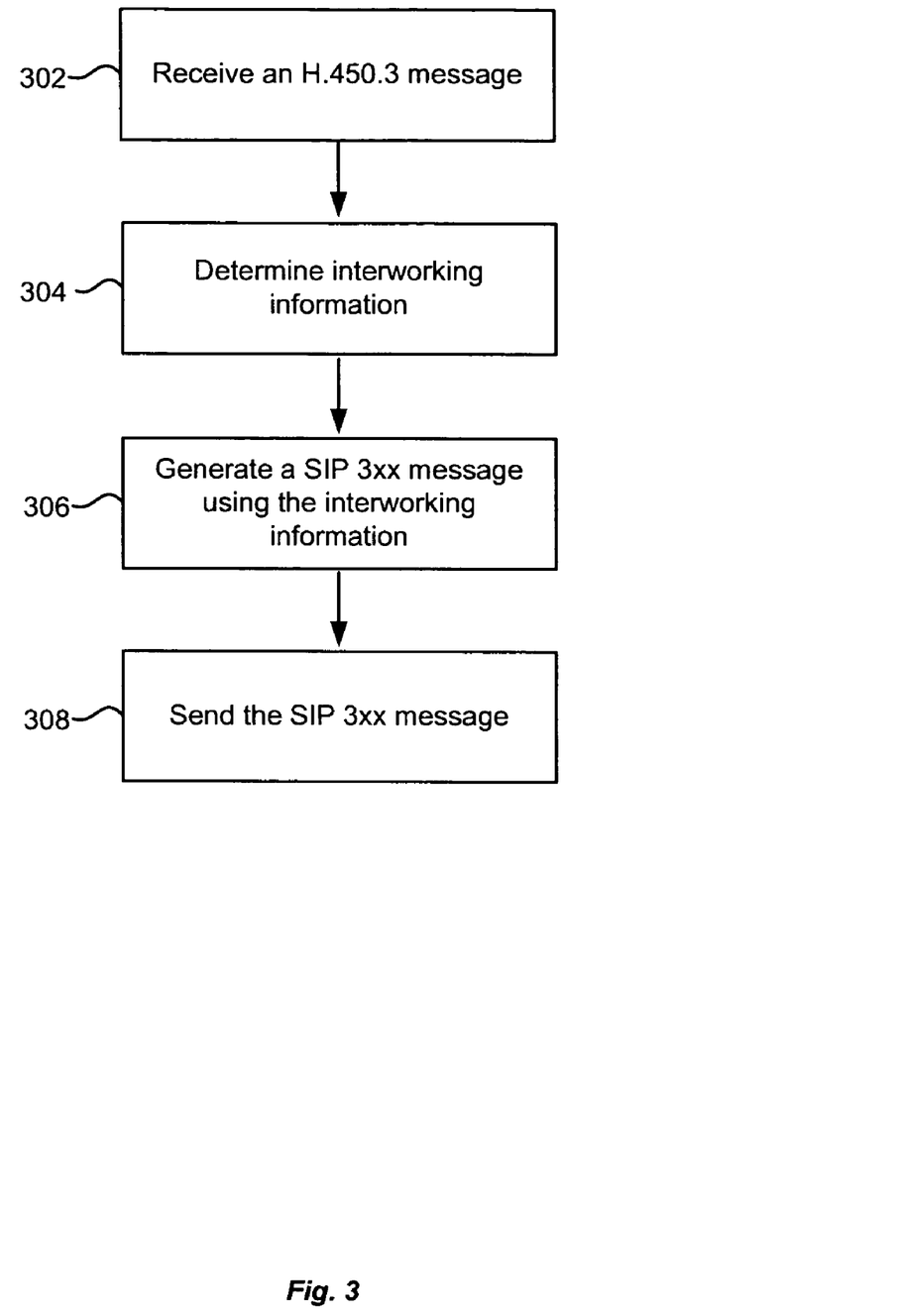
FIG. 3 illustrates an example method for interworking the H.450.3 message to a SIP 3xx message.

FIG. 3 illustrates an example method for interworking the H.450.3 message to a SIP 3xx message. In step 302, gateway 102 receives an H.450.3 message from end device 104-2 for the forward/redirection of the call to end device 104-3.

In step 304, gateway 102 determines interworking information for the call forward/redirection. Because end device 104-1 and end device 104-2 communicate using different protocols, the H.450.3 message cannot be forwarded to end device 104-1 to initiate the transfer. Accordingly, interworking information is determined. In a particular embodiment, gateway 102 parses the H.450.3 message to determine fields that include information that should be included in (or used to determine information to include in) the SIP 3xx message. In a particular embodiment, gateway 102 determines identification information for end device 104-3.

In step 306, gateway 102 generates a SIP 3xx message using the interworking information. The SIP 3xx message initiates a call forward/redirection to end device 104-3.

In step 308, gateway 102 sends the SIP 3xx message to end device 104-1. This initiates a transfer of the call to end device 104-3. As is known in the art, the forward may then be completed using additional H.323 messages and SIP messages.

Particular embodiments provide call forward/redirection for many options. For example, a call forward all, call forward on busy, and call forward on ring-no answer are provided. It will be appreciated that other call forward options may be appreciated. Various combinations of H.323 end devices 104 and SIP end devices 104 that are included in the call flow may also be appreciated.

Examples of call flows will now be described. Although these call flows will be described, it will be recognized that other call flows will be appreciated.

Figure 4:
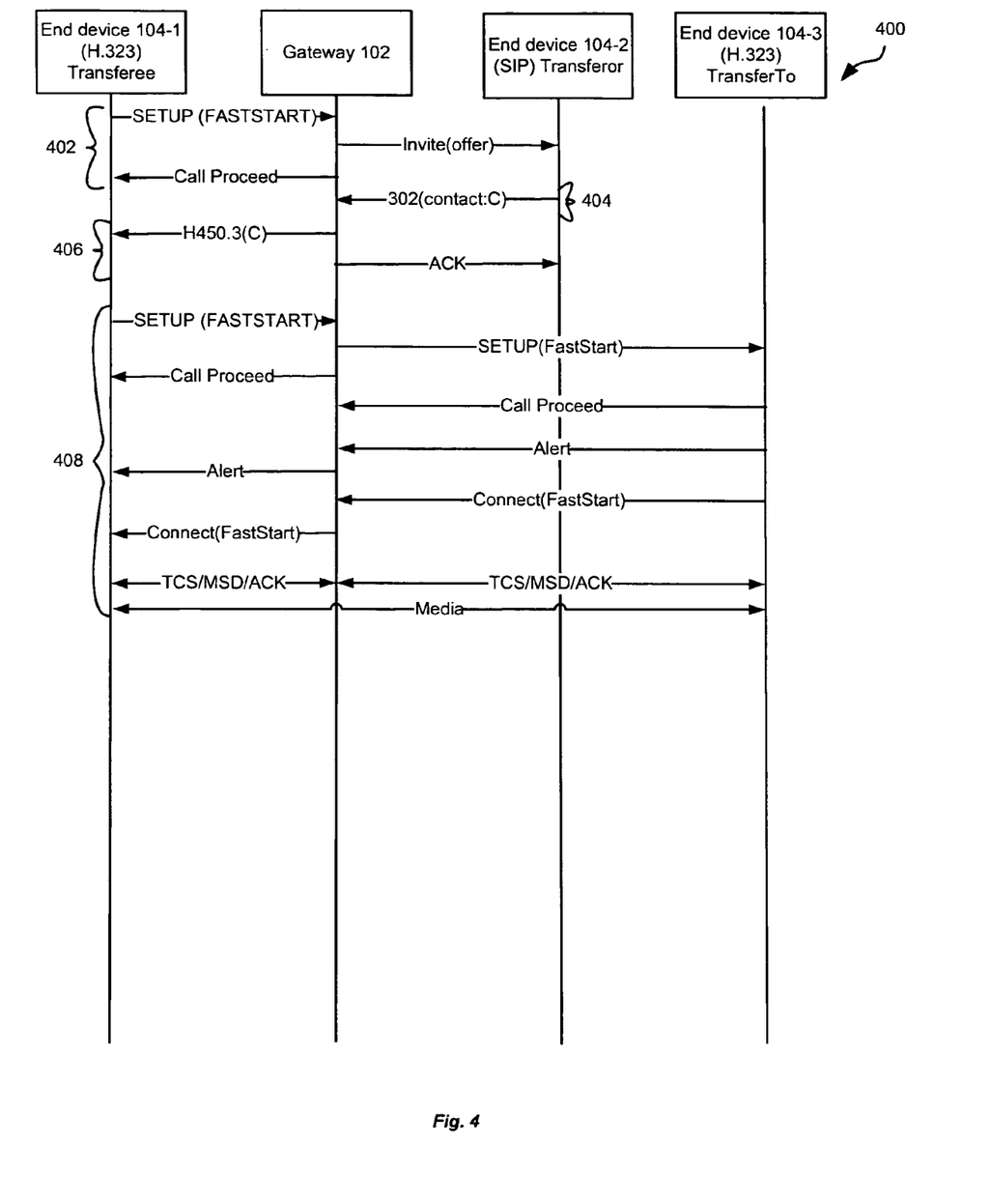
FIG. 4 illustrates an example call flow showing a redirection/call forward all option.

FIG. 4 illustrates an example call flow showing a redirection/call forward all option. In call flow 400, end device 104-1 is the transferee, end device 104-2 is the transferor, and end device 104-3 is the transferTo. In this case, the transferor initiates the forward of a call from the transferee to the transferTo. Also, end device 104-1 and end device 104-3 communicate using H.323 and end device 104-2 communicates using SIP.

In call flow 402, end device 104-1 initiates a call with end device 104-2. Because 104-1 communicates using H.323 and end device 104-2 communicates using SIP, a SETUP(FastStart) is interworked into an invite message for end device 104-2. In this case, a user a may be calling a user B.

In call flow 404, end device 104-2 sends a SIP 302 (contact C) message to gateway 102. In this case, all calls to end device 104-2 are forwarded to end device 104-3. Accordingly, end device 104-2 sends the call forward/redirection message automatically upon receiving an invite.

Figure 5A:
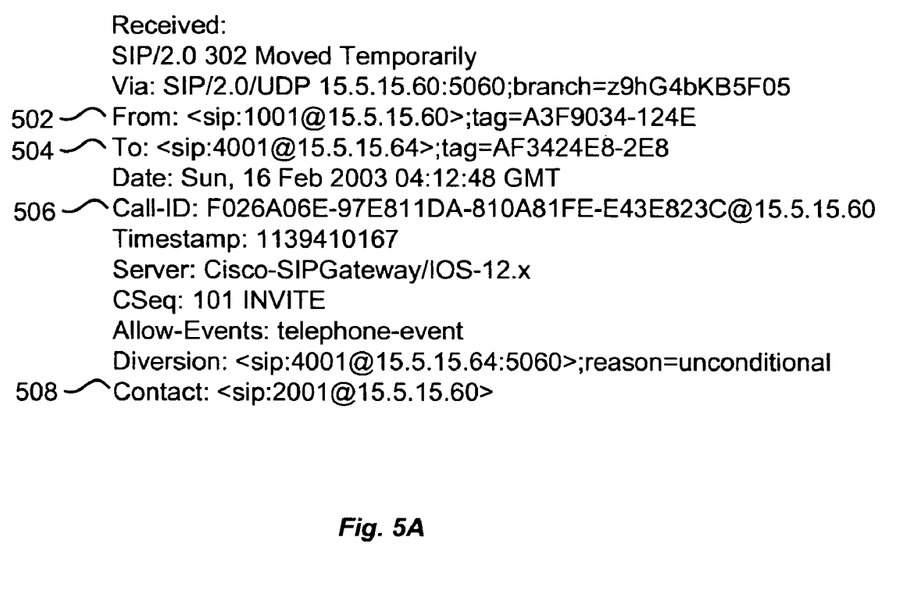
FIGS. 5A and 5B illustrate an example SIP 3xx message and an example H.450.3 message.
Figure 5B:
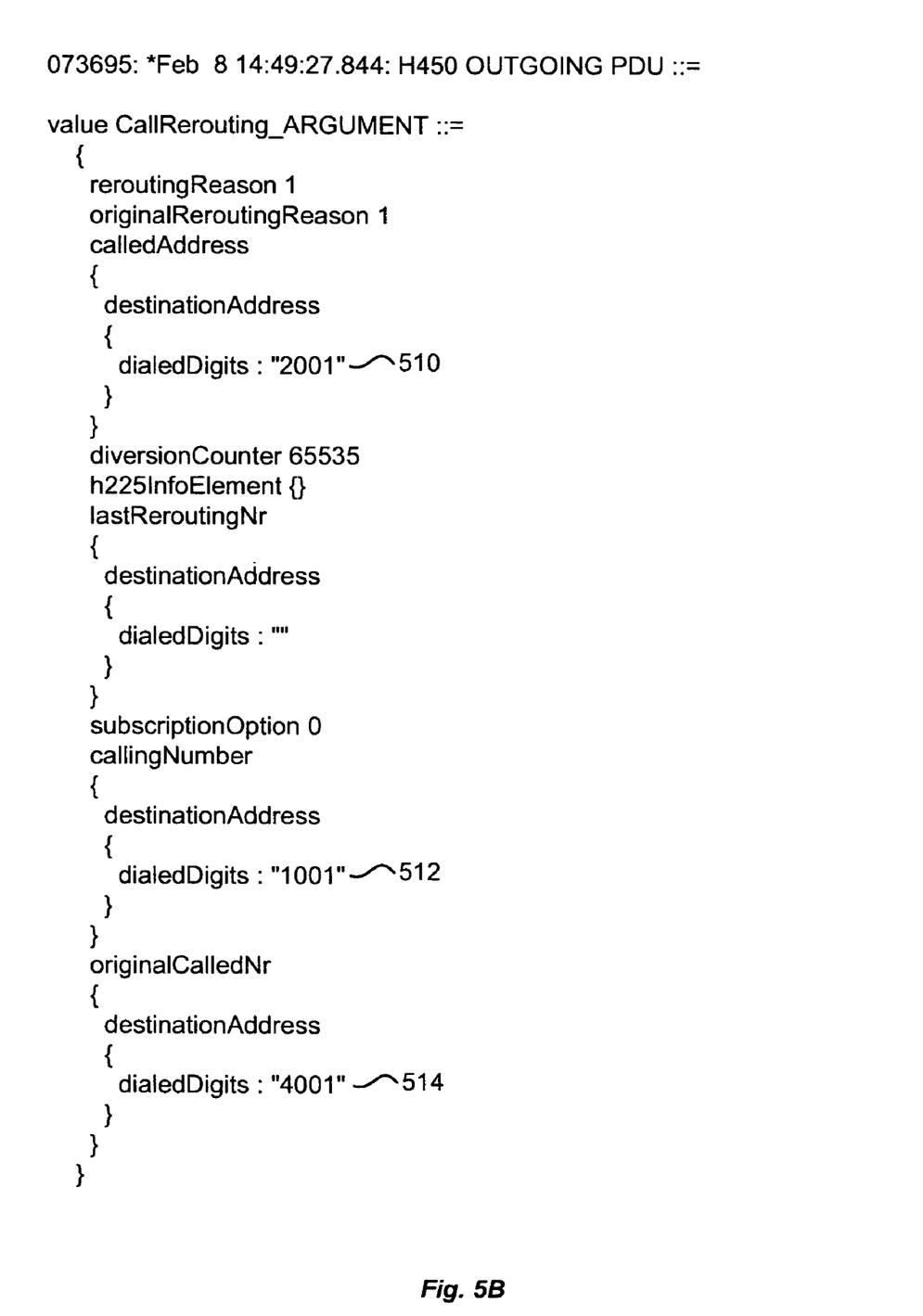

Gateway 102 then interworks the SIP 302 (contact: C) message to an H.450.3(C) message in call flow 406. As described above, gateway 102 determines interworking information from the SIP 302 (contact: C) message. FIGS. 5A and 5B depict examples of the SIP 302 message and the H.450.3 message according to a particular embodiment.

An example of a SIP 302 message is shown in FIG. 5A. The SIP 302 message includes a number of fields. A From field 502 indicates who the call forward/redirection request is coming from and a To field 504 indicates where the request is being sent. A call ID field 506 shows the identifier for the call. A Contact field 508 includes an identifier in which the call should be forwarded/redirected. As shown, it is requested that a call be forwarded to SIP:2001@15.5.15.60.

Gateway 102 parses the SIP 302 message to determine the interworking information. For example, the interworking information may include identifiers from From field 502, To field 504 and Contact field 508. This information may be needed to generate an H.450.3 message 408.

FIG. 5B depicts an example of an H.450.3 message. In a first dialedDigits field 510 representing a called address, a forwarded number from Contact field 508 is included. For example, the forwarded number "2001" is provided. This provides contact information for the forwarding number.

Also, in a second dialedDigits field 512 representing a calling number, contact information from the From field 502 is included. This provides contact information for the calling number.

In a third dialedDigits field 514 representing the originally called number, information from To field 504 is included. For example, the number of "4001" for the original number called is provided.

Accordingly, gateway 102 takes interworking information from the SIP 302 message and generates an H.450.3 message using that information.

Referring back to FIG. 4, a call flow 408 is provided to redirect the call from end device 104-2 to 104-3. For example, when the H.450.3 message is received at end device 104-1, end device 104-1 determines it should initiate a call to end device 104-3. For example, the identifier "C" is used to initiate a call to end device 104-3. As shown in call flow 408, signaling messages are provided to set up the call.

End device 104-1 and end device 104-3 communicate using H.323 and thus gateway 102 forwards the H.323 messages to set up the call.

When the call is set up between end device 104-1 and end device 104-3, media may flow between those devices. Accordingly, a call to end device 104-2 is redirected to end device 104-3.

Figure 6:
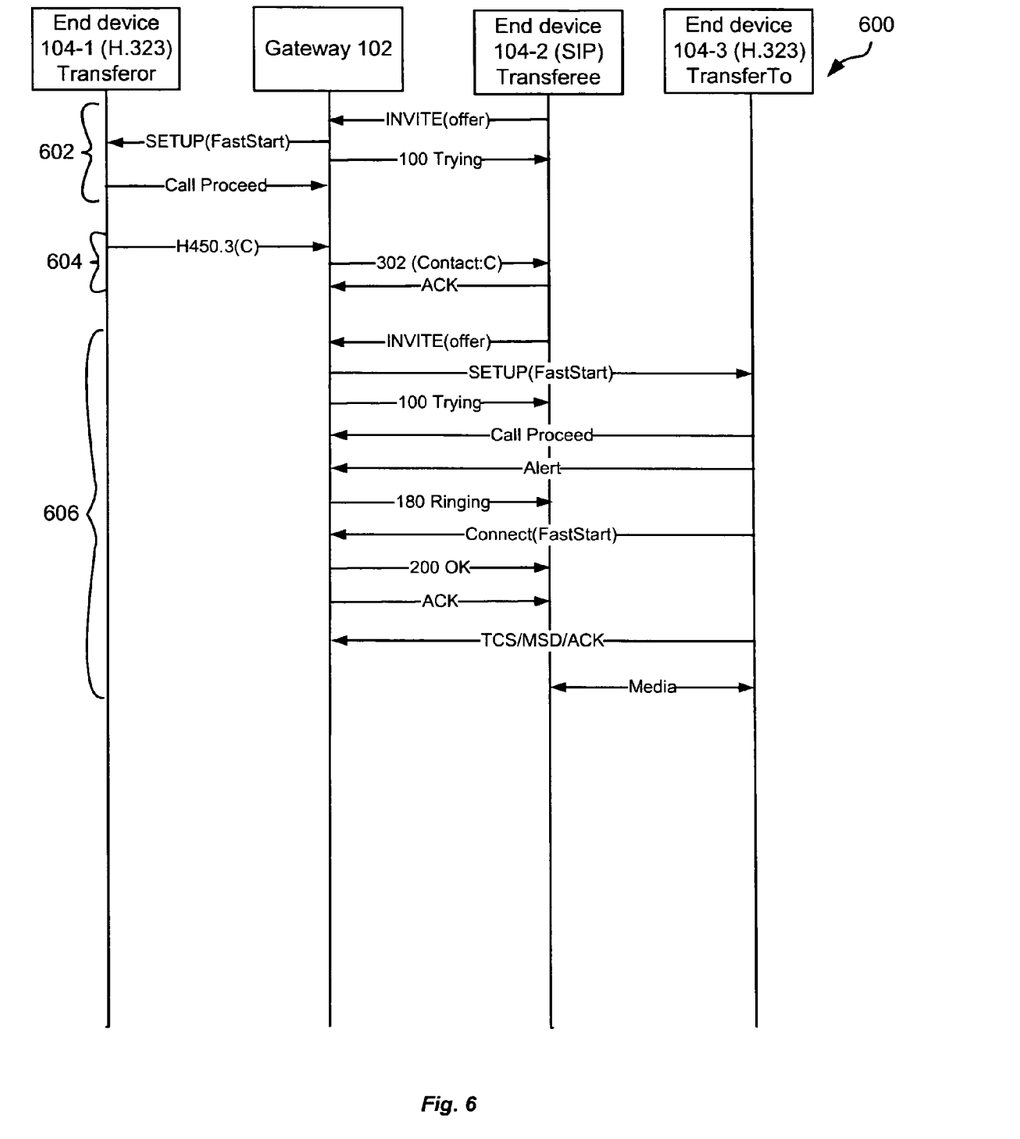
FIG. 6 illustrates an example call flow for a call forward all that interworks an H.450.3 message to a SIP 302 message.

FIG. 6 illustrates an example call flow for a call forward all that interworks an H.450.3 message to a SIP 302 message. As shown, end device 104-1 and end device 104-3 communicate using H.323 and end device 104-2 communicates using SIP. In this case, end device 104-1 is the transferor, end device 104-2 is the transferee, and end device 104-3 is the transferTo. In this case, end device 104-1 (transferor) initiates the forward of a call from end device 104-2 (transferee) to end device 104-3 (transferTo).

As shown, in a call flow 602, end device 104-2 initiates a call to end device 104-1.

In call flow 604, end device 104-1 forwards the call to end device 104-3. As shown, an H.450.3 message is sent to gateway 102. The H.450.3 message includes an identifier for end device 104-3 (e.g. the identifier "C").

End device 104-2 communicates using SIP and not H.323. Thus, gateway 102 interworks the H.450.3 message into a SIP 302 message. As discussed above, interworking information may be determined. The interworking information is then used to generate a SIP 302 message. As shown, the SIP 302 (contact: C) message is generated. This SIP message provides a redirection/call forward to end device 104-3 (the end device for the identifier of "C").

When end device 104-2 receives the SIP 302 message, end device 104-2 attempts to contact end device 104-3. As shown in a call flow 606, a SETUP is sent to gateway 102, which can then send a corresponding invite in H.323 to end device 104-3. This is because end device 104-2 communicates using SIP and end device 104-3 communicates using H.323. The process of setting up a call between end device 104-2 and end device 104-3 proceeds. When the call is set up, media may flow between end device 104-2 and end device 104-3.

It should be noted that the above call flows are for a media flow around where media flows directly between end devices 104 and not via gateway 102. However, signaling messages do flow through gateway 102. Similar call flows may be provided in which media flows through gateway 102, which a person skilled in the art will appreciate. In this case, gateway 102 may be included in the media flow such as the gateway's address and RTP ports, which are then used to terminate and re-originate media with end devices 104.

Accordingly, interworking is provided between H.323 and SIP networks for a call forward/redirection. Mapping between an H.450.3 message and a SIP 3xx message is provided. An H.450.3 or SIP 3xx message is parsed to create a new message in the other protocol. Gateway 102 can intelligently determine which information is needed to interwork a SIP 3xx message to an H.450.3 message, and vice versa. This allows a call forward/redirection to be provided between end devices 104 that are in different networks and use different protocols.

Figure 7:
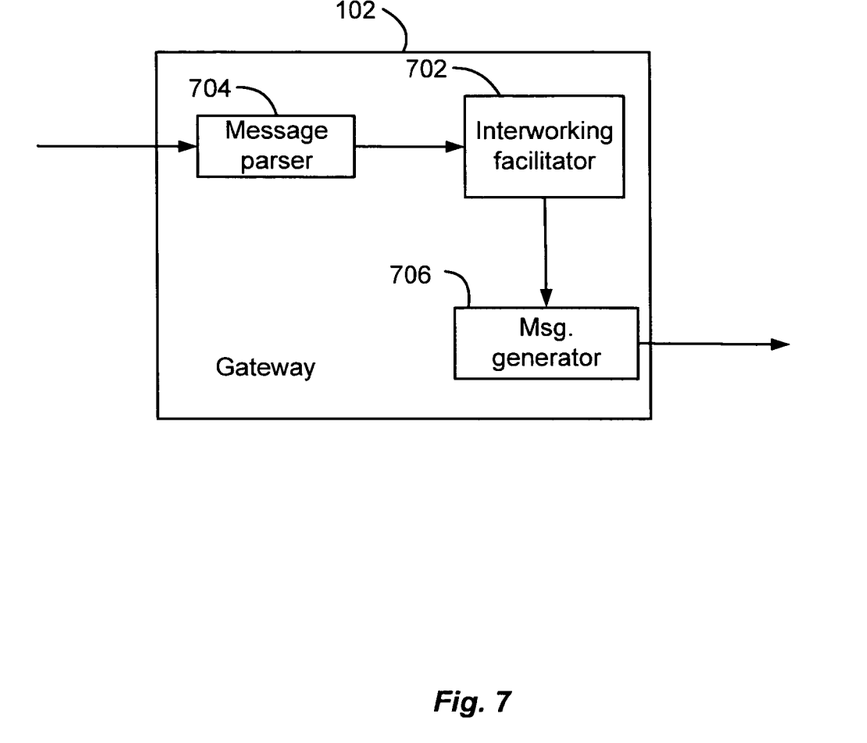
FIG. 7 illustrates an example gateway.

FIG. 7 illustrates an example gateway. As shown, an interworking facilitator 702, a message parser 704, and a message generator 706 are provided.

Message parser 704 then determines interworking information from the message received. Message parser 704 includes intelligence that parses fields of a message. For example, message parser 704 can parse an H.450.3 message and determine which information is needed for a SIP 3xx message. Further, message parser 704 can parse a SIP 3xx message and determine which information is needed for an H.450.3 message. For example, an identifier for the user in which the call will be forwarded may be determined. Also, any other information that is needed to generate a message in the other protocol is determined.

Interworking facilitator 702 is configured to determine when a call forward/redirection is requested. In this case, a SIP 3xx message or H.450.3 message for a call forward/redirection may be received.

Message generator 706 then generates a message. For example, if the call forward/redirection message is an H.450.3 message, message generator 706 generates a SIP 3xx message using the interworking information. Message generator 706 then sends the generated SIP 3xx message.

Although the invention has been described with respect to specific particular embodiments thereof, these particular embodiments are merely illustrative, and not restrictive of the invention. For example, protocols other than SIP and H.323 may be appreciated.

Any suitable programming language can be used to implement the routines of particular embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments of the present invention.

A "computer-readable medium" for purposes of particular embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Particular embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in particular embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or a "particular embodiment" means that a particular feature, structure, or characteristic described in connection with the embodiment is included in at least a particular embodiment and not necessarily in all particular embodiments. Thus, respective appearances of the phrases "in a particular embodiment", "in an embodiment", or "in a specific embodiment", or a "particular embodiment" in various places throughout this specification are not necessarily referring to the same embodiment. Furthermore, the particular features, structures, or characteristics of any specific embodiment of the present invention may be combined in any suitable manner with one or more other particular embodiments. It is to be understood that other variations and modifications of the particular embodiments described and illustrated herein are possible in light of the teachings herein and are to be considered as part of the spirit and scope of the present invention.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments of the present invention, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated particular embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of particular embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   receiving a signaling message from a first end device to initiate a first call to a second end device, where the first end device communicates using an H.323 protocol and the second end device communicates using a SIP protocol;
   sending an invite message to the second end device using the SIP protocol;
   receiving, from the second end device, a SIP 3xx message that includes a calling number, called number and originally called number;
   determining, based on the received SIP 3xx message, that a call forward/redirection of the first call to a third end device is required, where an identifier associated with the third end device is included in the SIP 3xx message;
   determining interworking information needed for interworking between the SIP protocol and the H.323 protocol for the call forward/redirection of the first call, by reading the SIP 3xx message and identifying redirection fields in the SIP 3xx message that are used to generate a message in the H.323 protocol, wherein the redirection fields include information associated with an originator and a destination of the call forward/redirection and information associated with the identifier of the third end device;
   generating an H.450.3 message for the H.323 protocol using the redirection fields to associate the H.450.3 message with the signaling message from the first end device such that the H.450.3 message provides information to the first end device related to the call forward/redirection of the first call from the second end device to the third end device, wherein generating the H.450.3 message comprises interworking the calling number, the called number and the originally called number to a To field, a From field, and a Contact field in the H.450.3 message;
   sending the H.450.3 message to the first end device;
   receiving, from the first end device and in response to sending the H.450.3 message, a signaling message to initiate a second call to the third end device, where the first end device and the third device communicate using the H.323 protocol; and
   transferring signaling messages between the third end device and the first end device using the H.323 protocol to set up the second call.

2. The method of claim 1, wherein the SIP 3xx message comprises a third user identifier for the third end device, wherein determining the interworking information comprises determining the third user identifier as part of the interworking information.

3. The method of claim 2, wherein generating the H.450.3 message comprises generating the H.450.3 message with the third user identifier.

4. A method comprising:
   receiving a signaling message from a first end device to initiate a first call to a second end device, where the first end device communicates using a SIP protocol and the second end device communicates using an H.323 protocol;
   sending an invite message to the second end device using the H.323 protocol;
   receiving, from the second end device, an H.450.3 message that includes a To field, a From field, and a Contact field;
   determining, based on the received H.450.3 message, that a call forward/redirection of the first call to a third end device is required, where an identifier associated with the third end device is included in the H.450.3 message;
   determining interworking information needed for interworking between the H.323 protocol and the SIP protocol for the call forward/redirection of the first call, by reading the H.450.3 message and identifying redirection fields in the H.450.3 message that are used to generate a message in the SIP protocol, wherein the redirection fields include information associated with an originator and a destination of the call forward/redirection and information associated with the identifier of the third end device;
   generating a SIP 3xx message for the SIP protocol using the redirection fields to associate the SIP 3xx message with the signaling message from the first end device such that the H.450.3 message provides information to the first end device related to the call forward/redirection of the first call from the second end device to the third end device, wherein generating the SIP 3xx message comprises interworking the To field, the From field, and the Contact field in the H.450.3 message to a calling number, a called number and an originally called number in the SIP 3xx message;

sending the SIP 3xx message to the first end device;
receiving, from the first end device and in response to sending the SIP 3xx message, a signaling message to initiate a second call to the third end device, where the first end device and the third device communicate using the SIP protocol; and
transferring signaling messages between the third end device and the first end device using the SIP protocol to set up the second call.

5. The method of claim 4, wherein the H.450.3 message comprises a third user identifier for the third end device, wherein parsing the H.450.3 message comprises determining the third user identifier as part of the interworking information.

6. The method of claim 5, wherein generating the SIP 3xx message comprises generating the SIP 3xx message with the third user identifier.

7. The method of claim 4, wherein the H.450.3 message includes a calling number, called number and originally called number, wherein generating a SIP 3xx message using the interworking information comprises interworking the calling number, called number and originally called number to a To field, a From field, and a Contact field in the SIP 3xx message.

8. The method of claim 4, further comprising:
responsive to receiving the signaling message from the first end device to initiate the second call to the third end device, sending the signaling message to the third end device.

9. An apparatus comprising:
a receiver configured to receive a signaling message from a first end device to initiate a first call to a second end device, where the first end device communicates using an H.323 protocol and the second end device communicates using a SIP protocol;
a sender configured to send an invite message to the second end device using the SIP protocol;
a receiver configured to receive, from the second end device, a SIP 3xx message that includes a calling number, called number and originally called number;
an interworking facilitator configured to determine, based on the received SIP 3xx message, that a call forward/redirection of the first call to a third end device is required, where an identifier associated with the third end device is included in the SIP 3xx message;
a message parser configured to determine interworking information needed for interworking between the SIP protocol and the H.323 protocol for the call forward/redirection of the first call, by reading the SIP 3xx message and identifying redirection fields in the SIP 3xx message that are used to generate a message in the H.323 protocol, wherein the redirection fields include information associated with an originator and a destination of the call forward/redirection and information associated with the identifier of the third end device;
a message generator configured to generate an H.450.3 message for the H.323 protocol using the redirection fields to associate the H.450.3 message with the signaling message from the first end device such that the H.450.3 message provides information to the first end device related to the call forward/redirection of the first call from the second end device to the third end device, wherein generating the H.450.3 message comprises interworking the calling number, the called number and the originally called number to a To field, a From field, and a Contact field in the H.450.3 message;
a first message sender configured to send the H.450.3 message to the first end device;
a first message receiver configured to receive, from the first end device and in response to sending the H.450.3 message, a signaling message to initiate a second call to the third end device, where the first end device and the third device communicate using the H.323 protocol; and
a second message sender and a second message receiver configured to transfer signaling messages between the third end device and the first end device using the H.323 protocol to set up the second call.

10. The apparatus of claim 9, wherein the SIP 3xx message comprises a third user identifier for the third end device, wherein determining the interworking information comprises determining the third user identifier as part of the interworking information.

11. The apparatus of claim 10, wherein the message generator is configured to generate the H.450.3 message with the third user identifier.

12. An apparatus comprising:
a receiver configured to receive a signaling message from a first end device to initiate a first call to a second end device, where the first end device communicates using a SIP protocol and the second end device communicates using an H.323 protocol;
a sender configured to send an invite message to the second end device using the H.323 protocol;
a receiver configured to receive, from the second end device, an H.450.3 message that includes a To field, a From field, and a Contact field;
an interworking facilitator configured to determine, based on the received H.450.3 message, that a call forward/redirection of the call to a third end device is required, where an identifier associated with the third end device is included in the H.450.3 message;
a message parser configured to determine interworking information needed for interworking between the H.323 protocol and the SIP protocol for the call forward/redirection of the first call, by reading the H.450.3 message and identifying redirection fields in the H.450.3 message that are used to generate a message in the SIP protocol, wherein the redirection fields include information associated with an originator and a destination of the call forward/redirection and information associated with the identifier of the third end device;
a message generator configured to generate a SIP 3xx message for the SIP protocol using the redirection fields to associate the SIP 3xx message with the signaling message from the first end device such that the H.450.3 message provides information to the first end device related to the call forward/redirection of the first call from the second end device to the third end device, wherein generating the SIP 3xx message comprises interworking the To field, the From field, and the Contact field in the H.450.3 message to a calling number, a called number and an originally called number in the SIP 3xx message;
a first message sender configured to send the SIP 3xx message to the first end device;
a first message receiver configured to receive, from the first end device and in response to sending the SIP 3xx message, a signaling message to initiate a second call to the third end device, where the first end device and the third device communicate using the SIP protocol; and
a second message sender and a second message receiver configured to transfer signaling messages between the third end device and the first end device using the SIP protocol to set up the second call.

13. The apparatus of claim 12, wherein the H.450.3 message comprises a third user identifier for the third end device, wherein parsing the H.450.3 message comprises determining the third user identifier as part of the interworking information.

14. The apparatus of claim 13, wherein the message generator is configured to generate the SIP 3xx message with the third user identifier.

15. The apparatus of claim 12, wherein the H.450.3 message includes a calling number, called number and originally called number wherein generating a SIP 3xx message using the interworking information comprises interworking the calling number, called number and originally called number to a To field, a From field, and a Contact field in the SIP 3xx message.

16. The apparatus of claim 12, wherein the second message sender is configured to, responsive to the first message receiver receiving the signaling message from the first end device to initiate the second call to the third end device, send the signaling message to the third end device.

17. An apparatus configured to provide interworking between an H.323 protocol and a SIP protocol for a call forward/redirection of a call from a first end device to a second end device, the apparatus comprising:
   circuitry for receiving a signaling message from a first end device to initiate a first call to a second end device, where the first end device communicates using an H.323 protocol and the second end device communicates using a SIP protocol;
   a processor; and
   one or more instructions included in a non-transitory machine-readable medium for execution by the processor, and when executed by the processor cause the processor to perform operations including:
      sending an invite message to the second end device using the SIP protocol;
      receiving, from the second end device, a SIP 3xx message that includes a calling number, called number and originally called number;
      determining, based on the received SIP 3xx message, that a call forward/redirection of the first call to a third end device is required, where an identifier associated with the third end device is included in the SIP 3xx message;
      determining interworking information needed for interworking between the SIP protocol and the H.323 protocol for the call forward/redirection of the call, by reading the SIP 3xx message and identifying redirection fields in the SIP 3xx message that are used to generate a message in the H.323 protocol, wherein the redirection fields include information associated with an originator and a destination of the call forward/redirection and information associated with the identifier of the third end device;
      generating an H.450.3 message for the H.323 protocol using the redirection fields to associate the H.450.3 message with the signaling message from the first end device such that the H.450.3 message provides information to the first end device related to the call forward/redirection of the first call from the second end device to the third end device, wherein generating the H.450.3 message comprises interworking the calling number, the called number and the originally called number to a To field, a From field, and a Contact field in the H.450.3 message;
      sending the H.450.3 message to the first end device;
      receiving, from the first end device and in response to sending the H.450.3 message, a signaling message to initiate a second call to the third end device, where the first end device and the third device communicate using the H.323 protocol; and
      transferring signaling messages between the third end device and the first end device using the H.323 protocol to set up the second call.

18. An apparatus configured to provide interworking between an H.323 protocol and a SIP protocol for a call forward/redirection of a call from a first end device to a second end device, the apparatus comprising:
   circuitry for receiving a signaling message from a first end device to initiate a first call to a second end device, where the first end device communicates using a SIP protocol and the second end device communicates using an H.323 protocol;
   a processor; and
   one or more instructions included in a non-transitory machine-readable medium for execution by the processor, and when executed by the processor cause the processor to perform operations including:
      sending an invite message to the second end device using the H.323 protocol that includes a To field, a From field, and a Contact field;
      receiving, from the second end device, an H.450.3 message;
      determining, based on the received H.450.3 message, that a call forward/redirection of the first call to a third end device is required, where an identifier associated with the third end device is included in the H.450.3 message;
      determining interworking information needed for interworking between the H.323 protocol and the SIP protocol for the call forward/redirection of the first call, by reading the H.450.3 message and identifying redirection fields in the SIP 3xx message that are used to generate a message in the H.323 protocol, wherein the redirection fields include information associated with an originator and a destination of the call forward/redirection and information associated with the identifier of the third end device;
      generating a SIP 3xx message for the SIP protocol using the redirection fields to associate the SIP 3xx message with the signaling message from the first end device such that the H.450.3 message provides information to the first end device related to the call forward/redirection of the first call from the second end device to the third end device, wherein generating the SIP 3xx message comprises interworking the To field, the From field, and the Contact field in the H.450.3 message to a calling number, a called number and an originally called number in the SIP 3xx message;
      sending the SIP 3xx message to the first end device;
      receiving, from the first end device and in response to sending the SIP 3xx message, a signaling message to initiate a second call to the third end device, where the first end device and the third device communicate using the SIP protocol; and
      transferring signaling messages between the third end device and the first end device using the SIP protocol to set up the second call.

* * * * *